United States Patent
Tian et al.

(10) Patent No.: US 10,894,235 B2
(45) Date of Patent: Jan. 19, 2021

(54) COMPOSITE MEMBRANES AND APPLICATIONS THEREOF

(71) Applicant: The Board of Trustees of the University of Arkansas, Little Rock, AR (US)

(72) Inventors: Zheng R. Tian, Fayetteville, AR (US); Hulusi Turgut, Fayetteville, AR (US)

(73) Assignee: The Board of Trustees of the University of Arkansas, Little Rock, AR (US)

( * ) Notice: Subject to any disclaimer, the term of this patent is extended or adjusted under 35 U.S.C. 154(b) by 57 days.

(21) Appl. No.: 16/118,164

(22) Filed: Aug. 30, 2018

(65) Prior Publication Data
US 2019/0060843 A1    Feb. 28, 2019

Related U.S. Application Data

(60) Provisional application No. 62/552,662, filed on Aug. 31, 2017.

(51) Int. Cl.
| | |
|---|---|
| *B01D 71/62* | (2006.01) |
| *B01D 69/12* | (2006.01) |
| *B01J 39/17* | (2017.01) |
| *B01J 39/19* | (2017.01) |
| *B01D 67/00* | (2006.01) |
| *H01M 8/10* | (2016.01) |
| *H01M 8/02* | (2016.01) |
| *B01D 69/14* | (2006.01) |
| *H01M 8/1051* | (2016.01) |

(Continued)

(52) U.S. Cl.
CPC ......... *B01D 71/62* (2013.01); *B01D 67/0079* (2013.01); *B01D 69/12* (2013.01); *B01D 69/148* (2013.01); *B01J 39/17* (2017.01); *B01J 39/19* (2017.01); *H01M 8/0293* (2013.01); *H01M 8/1051* (2013.01); *B01D 71/021* (2013.01); *B01D 2325/22* (2013.01); *B01D 2325/24* (2013.01); *B01D 2325/26* (2013.01); *B01D 2325/42* (2013.01); *H01M 2300/0085* (2013.01)

(58) Field of Classification Search
CPC ...... B01D 71/62; B01D 71/021; B01D 69/12; B01D 69/148; B01D 67/0079; B01D 2325/22; B01D 2325/24; B01D 2325/42; B01D 2325/26; B01J 39/17; B01J 39/19; H01M 8/1051; H01M 8/0293; H01M 2300/0085
USPC .......................................................... 521/27
See application file for complete search history.

(56) References Cited

PUBLICATIONS

Hue et al. "Graphite oxide/functionalized graphene oxide and polybenzimidazole composite membranes for high temperature proton exchange membrane fuel cells", International Journal of Hydrogen Energy, 39 (2014), pp. 7931-7939. (Year: 2014).*

(Continued)

*Primary Examiner* — Michael Bernshteyn
(74) *Attorney, Agent, or Firm* — J. Clinton Wimbish; Nexsen Pruet, PLLC

(57) ABSTRACT

In one aspect, a composite membrane comprises a polymeric host comprising polybenzimidazole or polybenzimidazole derivative and graphene oxide dispersed in the polymeric host, the graphene oxide at least partially functionalized with phosphonic acid moieties, phosphonate moieties or combinations thereof. In some embodiments, the functionalized graphene oxide is homogeneously dispersed in the polymeric host and/or is not agglomerated in the polymeric host.

15 Claims, 11 Drawing Sheets

(51) Int. Cl.
   *H01M 8/0293*    (2016.01)
   *B01D 71/02*     (2006.01)

(56) References Cited

PUBLICATIONS

Uregen et al. "Development of polybenzimidazole/graphene oxide composite membranes for high temperature PEM fuel cells, ", International Journal of Hydrogen Energy, 42 (2017), pp. 2636-2647. (Year: 2017).*

* cited by examiner

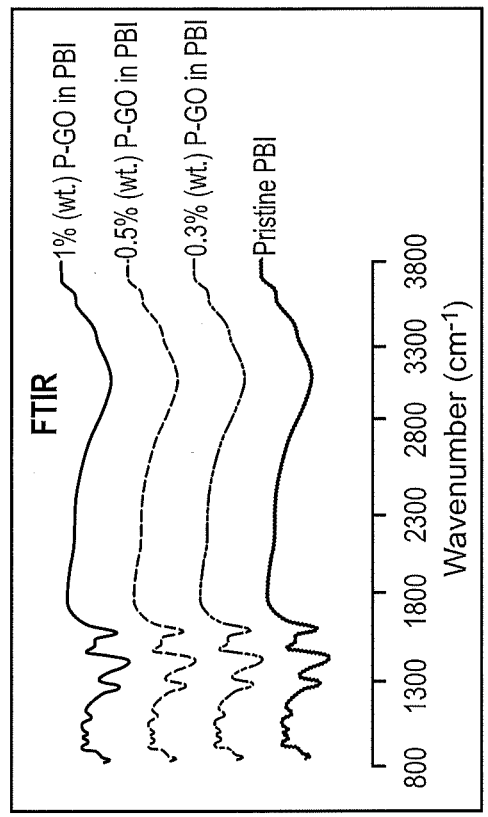
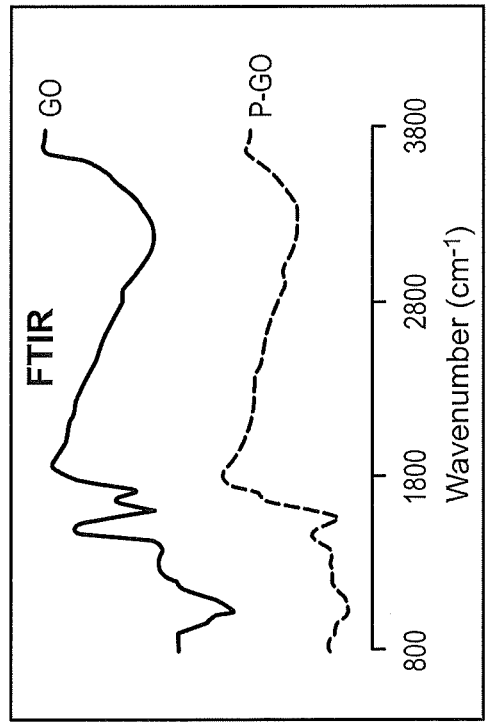
FIG. 4B
FIG. 4A

COMPOSITE MEMBRANES AND APPLICATIONS THEREOF

RELATED APPLICATION DATA

The present application claims priority pursuant to 35 U.S.C. § 119(e) to U.S. Provisional Patent Application Ser. No. 62/552,662 filed Aug. 31, 2017 which is incorporated herein by reference in its entirety.

STATEMENT OF GOVERNMENT RIGHTS

This invention was made with government support under Grant No. EPSCoR 1457888 awarded by the National Science Foundation (NSF). The government has certain rights in the invention.

FIELD

The present invention relates to composite membranes comprising functionalized graphene oxide and, in particular, to proton exchange membranes comprising functionalized graphene oxide dispersed in a polymeric host.

BACKGROUND

In both fuel-cell and membrane science, a long-unmet challenge is to develop a mechanically strong, thermally stable and highly ion-conducting proton exchange membrane (PEM). In developing such a truly industry viable PEM, polymer-nanoblending plays an important role. A common problem in polymer-nanoblending science and engineering is phase separation due to the nanofillers' agglomeration and poor dispersibility in the polymer matrix. Moreover, nanocomposite membranes often undergo spinodal decomposition and/or other degradative pathways when employed in various operating environments. Therefore, even if polymer-nanoblending is successful, the resultant composite membrane is likely to experience a limited lifetime in the operating environment.

SUMMARY

In view of these disadvantages, composite membranes are described herein which, in some embodiments, exhibit high temperature stability and desirable mechanical properties, including high Young's Modulus and tensile strength. In one aspect, a composite membrane comprises a polymeric host including polybenzimidazole or polybenzimidazole derivative and graphene oxide dispersed in the polymeric host, wherein the graphene oxide is at least partially functionalized with phosphonic acid moieties, phosphonate moieties or combinations thereof. In some embodiments, the functionalized graphene oxide is homogeneously dispersed in the polymeric host and/or is not agglomerated in the polymeric host.

In another aspect, proton exchange membranes are provided. A proton exchange membrane comprises a polymeric host comprising polybenzimidazole or polybenzimidazole derivative and graphene oxide dispersed in the polymeric host, wherein the graphene oxide is at least partially functionalized with phosphonic acid moieties, phosphonate moieties or combinations thereof, and wherein the proton exchange membrane is impregnated with phosphoric acid. In some embodiments, the proton exchange membrane exhibits proton conductivity of 0.07-0.09 S/cm at 80° C. Additionally, the membrane exhibits proton conductivity up to temperature of 200° C.

In a further aspect, methods of making composite membranes are provided. In some embodiments, a method of making a composite membrane comprises providing a polymeric host comprising polybenzimidazole or polybenzimidazole derivative and at least partially functionalizing graphene oxide with phosphoric acid moieties, phosphonate moieties or combinations thereof. The functionalized graphene oxide is blended with the polymeric host. As described herein, the functionalized graphene oxide can be homogenously dispersed in the polymeric host and/or does not form agglomerates in the polymeric host.

These and other embodiments are further described in the following detailed description.

BRIEF DESCRIPTION OF THE DRAWINGS

FIGS. 2(a)-(f) are optical images of polymeric and composite membranes comprising GO and P-GO according to some embodiments.

FIG. 4—FTIR results. (a) GO and P-GO. (b) P-GO/PBI composites and pure PBI.

DETAILED DESCRIPTION

Embodiments described herein can be understood more readily by reference to the following detailed description and examples and their previous and following descriptions. Elements, apparatus and methods described herein, however, are not limited to the specific embodiments presented in the detailed description and examples. It should be recognized that these embodiments are merely illustrative of the principles of the present invention. Numerous modifications and adaptations will be readily apparent to those of skill in the art without departing from the spirit and scope of the invention.

Partially Phosphonating Graphene Oxide (GO) and Nano-blending into PBI Host

A partial phosphonation was designed for replacing part of the oxo groups on the GO. In some embodiments, a mild heating over a longer time should be chosen to help prevent heat-sensitive oxo groups from detaching from the GO. Therefore, the partial phosphonation was controlled at temperature below 80° C. for 24 hours. The resultant P-GO was homogeneously dispersed in the PBI with the loading up to 1.0 wt % without any agglomeration.

Figure 1:
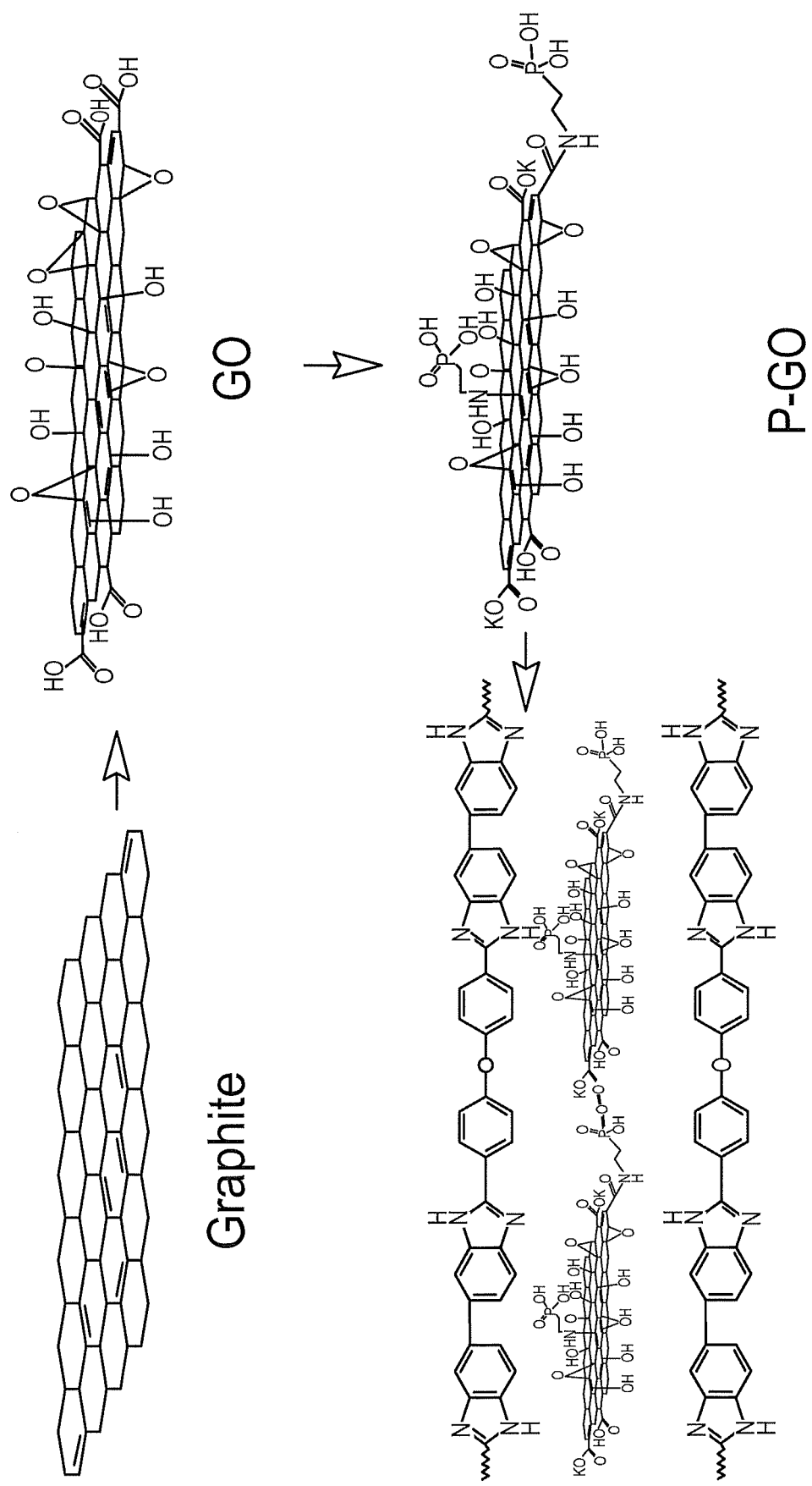
FIG. 1 illustrates formation and functionalization of graphene oxide (GO) according to some embodiments.
Figure 2C:
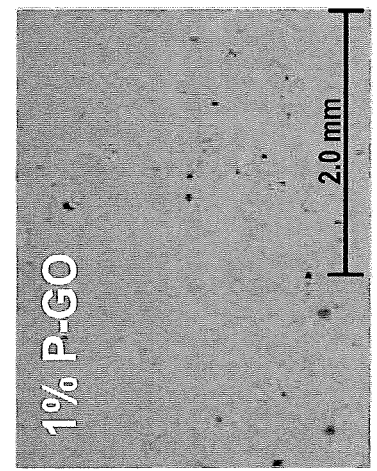
Figure 2B:
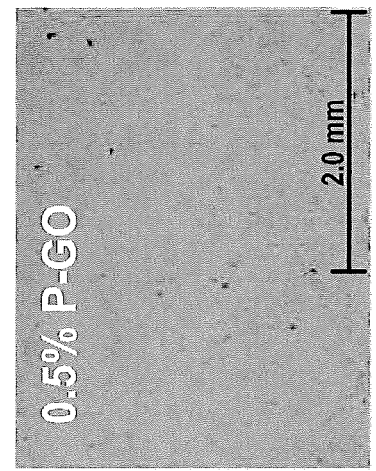
Figure 2A:
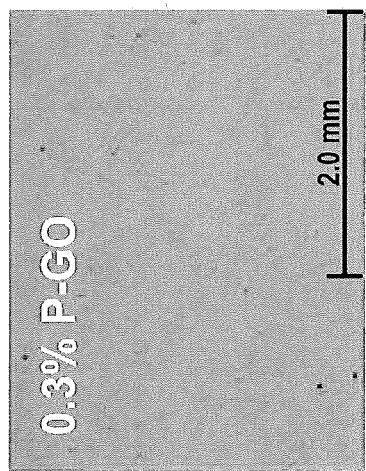
Figure 2E:
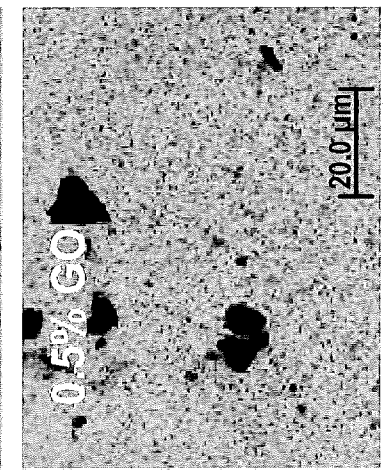
Figure 2D:
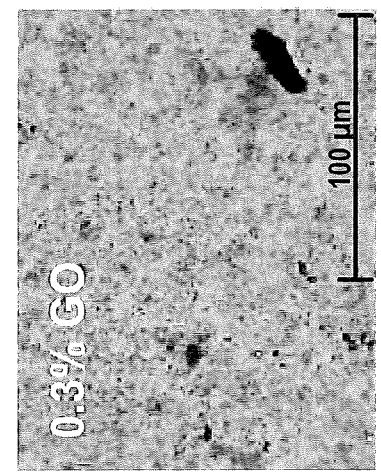
Figure 3:
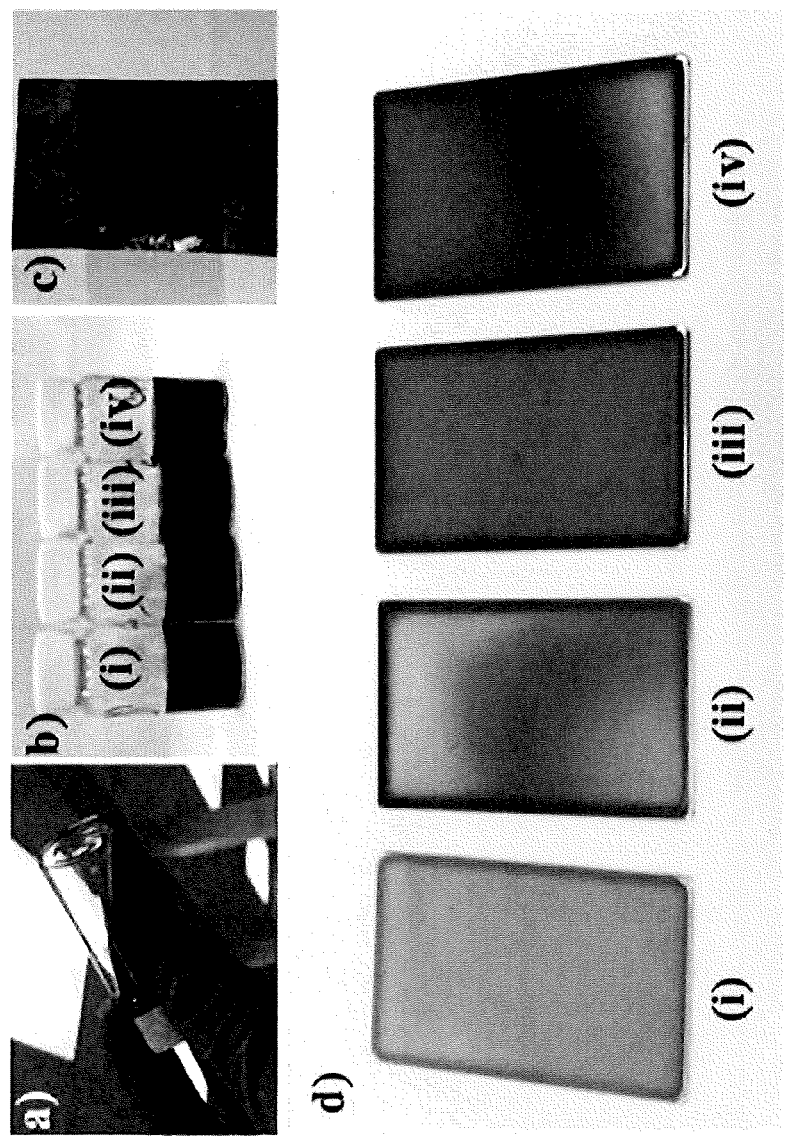
FIG. 3—Photographs of samples. (a) 1 wt. % P-GO/PBI suspension in DMAC. (b) Various concentration of P-GO/PBI in DMAc solution. (c) 1 wt. % GO/PBI composite membrane on a glass slide shows substantial phase-separation and agglomeration. (d) P-GO/PBI composite membranes on glass microslides (3"×2") showing no agglomeration in PBI containing 0 wt % P-GO (i), 0.3 wt. % P-GO (ii), 0.5 wt. % P-GO (iii), and 1 wt. % P-GO (iv), respectively.

For comparison, both P-GO and GO were each dispersed in the dimethylacetamide (DMAc) and then mixed into a PBI/DMAc solution. At this step, the GO/PBI solution exhibited agglomerated particles upon mixing (FIG. 2), due apparently to the fact that GO's surface carboxylic acid groups interacted with PBI's —NH groups which gave rise to the phase separation and agglomeration. To minimize the agglomeration, GO's carboxylic acid groups were partially reduced and slightly phosphonated under the help of 2-aminoethylphosphonicacid (2-AEP). As shown in FIG. 2(e-h) and FIG. 3c, the GO/PBI composites agglomerated more at higher GO concentrations, while on the contrary the P-GO/PBI composites are clear homogenous membranes.

Structural Characterization

The Fourier-transform infrared (FTIR) spectra of pure PBI membranes are shown in FIG. 4. As expected, isolated N—H stretching due to the imidazole exhibited a sharp band from 3450 $cm^{-1}$ to 3400 $cm^{-1}$, and self-associated N—H bonds exhibited a peak between 3250-2500 $cm^{-1}$. Typical C=C and C=N stretching were observed in the region of 1630-1500 $cm^{-1}$. Benzimidazole ring in plane deformation appeared at 1495-1395 $cm^{-1}$; whereas, C—H in plane deformations appeared at 1235-1225 $cm^{-1}$. It was previously reported that the band around 1277 $cm^{-1}$ is an indication of the breathing mode of the imidazole ring in PBI. As anticipated, introducing P-GO into PBI did not exhibit significant changes at FTIR spectrum of PBI which supports the homogenous distribution of P-GO in the PBI.

In comparison to the GO's typical stretching vibrations of C=O (1716 $cm^{-1}$), aromatic C=C (1616 $cm^{-1}$), carbonyl (or carboxyl) C—O (1411 $cm^{-1}$), epoxy C—O (1184 $cm^{-1}$), and alkoxy C—O (1035 $cm^{-1}$), the P-GO exhibited a much lower C=O (1697 $cm^{-1}$), carboxyl C—O (1440 $cm^{-1}$), and alkoxy C—O (1029 $cm^{-1}$) stretching vibrations. This confirmed GO's oxygen containing groups were partially reduced and phosphonic acid successfully introduced onto the GO. New peaks of vibration were observed at 2920 $cm^{-1}$ and 1236 $cm^{-1}$, telling the vibrations for P-GO's C=O and aromatic C=C groups were slightly shifted to a lower wavenumber. This suggests that new bonding was formed between phosphonic acid groups and GO. P-GO exhibited C—N stretch around 1560 $cm^{-1}$, which is another evidence of the successful phosphonation on the GO.

Figure 5B:
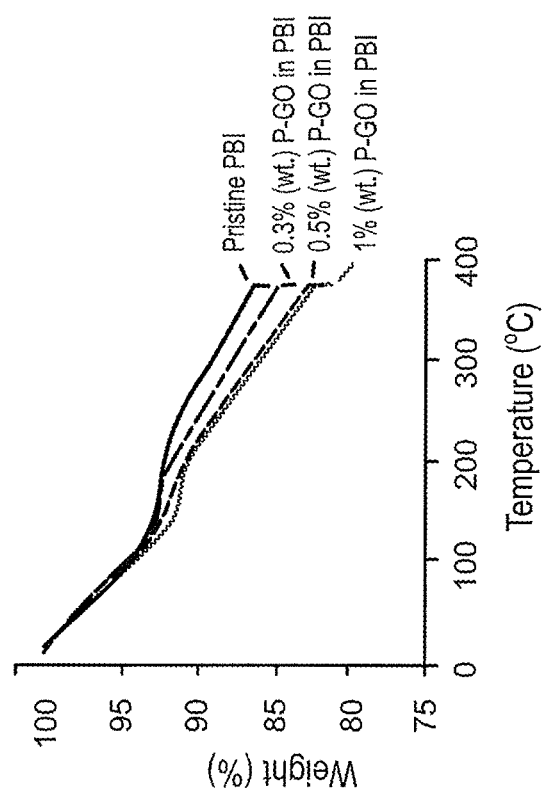
FIG. 5—TGA results of (a) GO and P-GO. (b) Pure PBI and P-GO/PBI composite membranes.
Figure 5A:
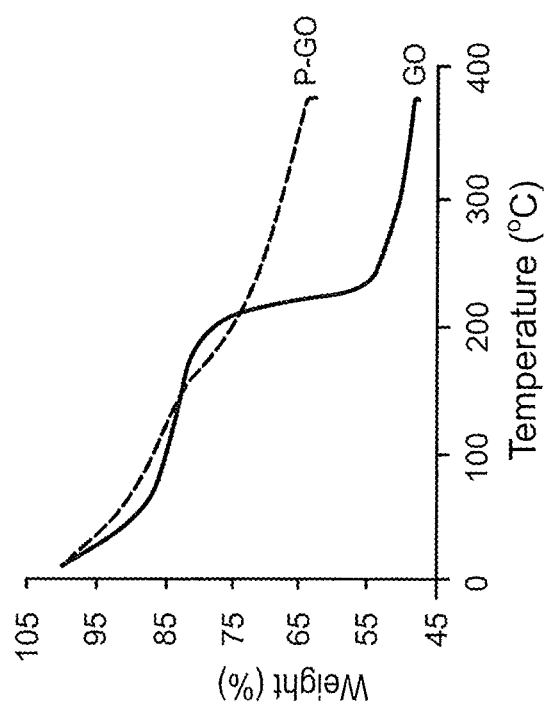

Thermogravimetric (TGA) data of GO and P-GO were compared in FIG. 5. The minor mass-loss for both samples around 100° C. can be attributed to desorption of physisorbed water on the samples. Thermal stability of P-GO is far better than GO, since P-GO is partially reduced and hydroxyl groups are highly thermal-stable; whereas, GO has thermally degradable oxygenate groups. P-GO started to lose mass slowly after the temperature reached to 150° C., and 65% of mass remained even heated to 350° C. On the contrary, the rapid and major thermal decomposition was observed for GO at around 200° C. because of the removal of the thermally labile oxygenated groups, with <47% mass leftover when reaching 350° C. The TGA curves of ordinary PBI and various-loading P-GO/PBI composite membranes exhibited a thermal decomposition rate similar to that of the pure PBI membrane.

Figure 6B:
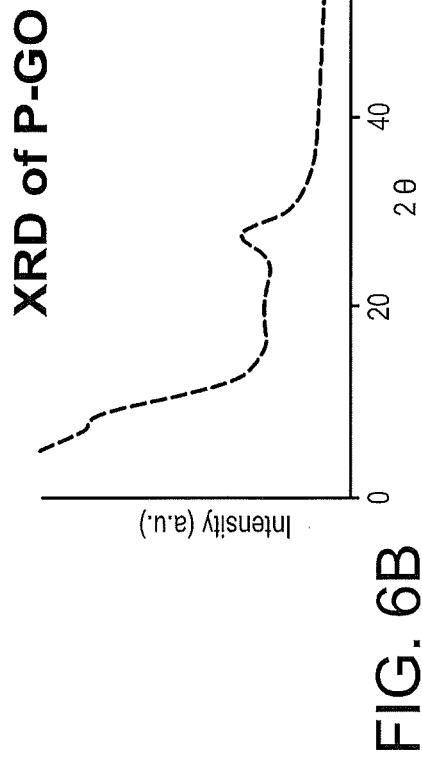
FIG. 6 provides X-ray diffraction of (a) GO. (b) P-GO. (c) Pure PBI and P-GO/PBI composites.
Figure 6A:
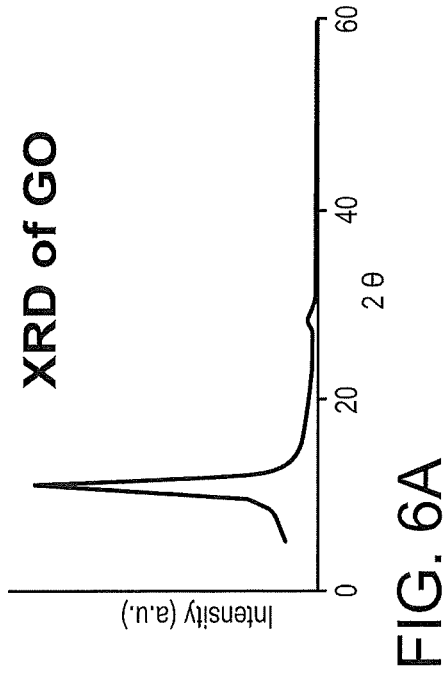
Figure 6C:
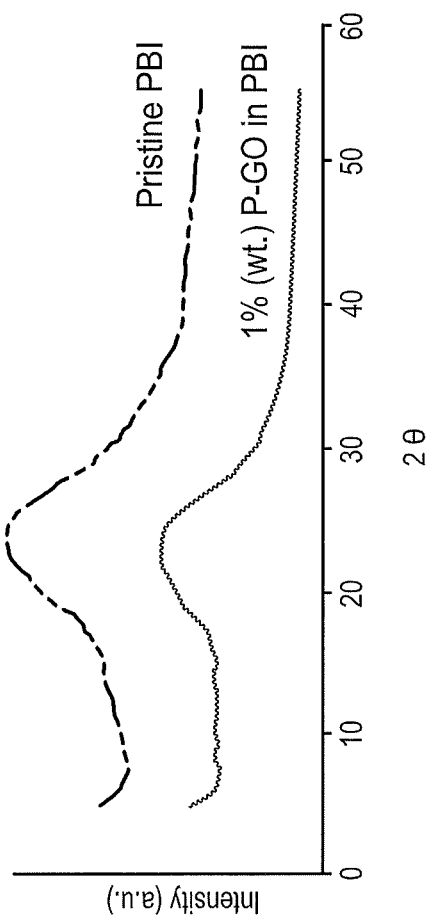

X-ray diffraction (XRD) pattern of GO and P-GO were compared in FIG. 6. GO exhibited a characteristic peak at 2θ=11.06°, and a weak peak at 28.49° which is associated with graphitic structure. P-GO exhibited a peak at about 8.9°, which is in line with the successful phosphonation on the GO. P-GO's second peak at about 28.4° was stronger than GO's peak. It is well documented in literature that r-GO exhibits a peak at about 28° whereas GO exhibits a peak around 10°. Upon losing part of the oxo-groups, the partially reduced rGO show a very weak peak around 28°. Thus, the leftover oxo-groups on the P-GO showed both ~28° and ~8.9° peaks.

The XRD peak of the pure PBI membrane was observed at 2θ=24°. This broad peak indicates the convolution of amorphous and crystalline regions. P-GO/PBI membrane resulted in a slight increase in the region between 9°-20° due to the convolution of P-GO and typical PBI diffraction peak. The XRD results are in line with the abovementioned FTIR.

Proton Conductivity Testing

Figure 7B:
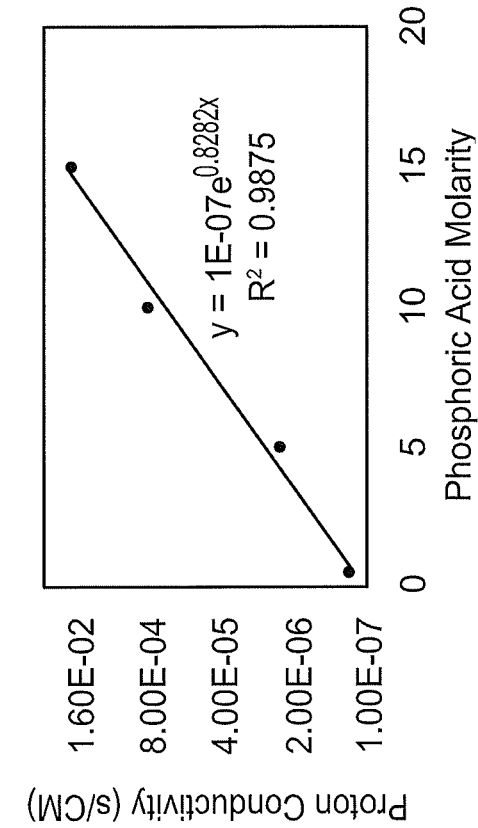
FIG. 7—(a) Phosphoric acid uptake of pure PBI as a function of molarity. (b) Conductivities of the PA-treated PBI membranes from various concentrations of PA aqueous solutions.
Figure 7A:
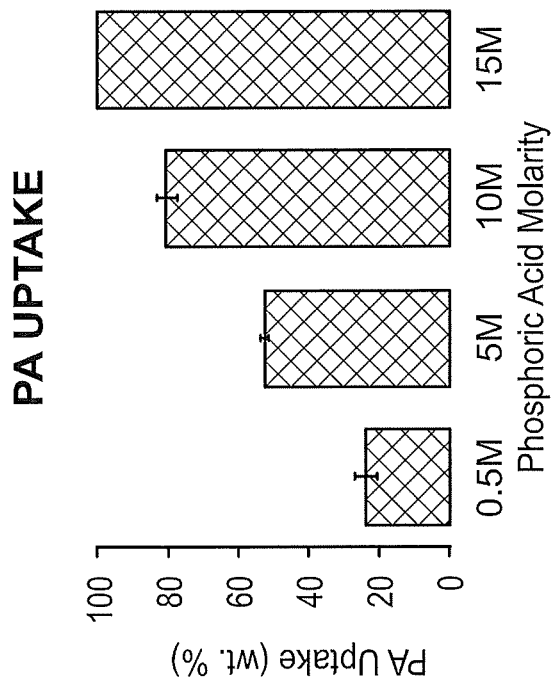

FIG. 7 (a) shows the phosphoric acid (PA) uptake of the pure PBI membranes. The proton conductivities of PA-impregnated membranes at various molarity (M) were recorded at 80° C. in a humidity chamber, and results from 0.5 M, 5 M, 10 M, and 15 M PA solutions were obtained as $2.26 \times 10^{-7}$, $4.08 \times 10^{-6}$, $9.88 \times 10^{-4}$, $2.55 \times 10^{-2}$ (S/cm), respectively (FIG. 7(b)). As designed, the more concentrated PA was used, the greater PA uptake was achieved by the PBI membranes, and PA uptake reached 128% (wt/wt) when pure PBI membrane was impregnated in 15 M PA. A possible explanation of membrane's low conductivity when it is soaked into lower than 5 M PA is that the PA needs time and energy to diffuse into the PBI matrix and establish enough proton conducting pathways across the PBI membrane. Accordingly, when PBI is impregnated with higher concentration of PA, more conducting pathways were established.

Figure 8A:
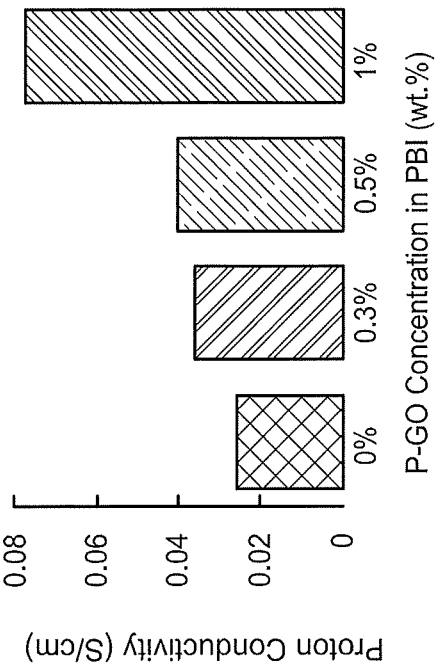
FIG. 8—Proton Conductivity Tests. (a) Conductivity of P-GO/PBI composite as a function of P-GO concentration in PBI at 80° C., in humidity chamber without PA treatment. (b) Conductivity of pure PBI and P-GO/PBI at 80° C., in humidity chamber with PA treatment. (c) Conductivity of pure PBI and P-GO/PBI as a function of temperature.
Figure 8B:
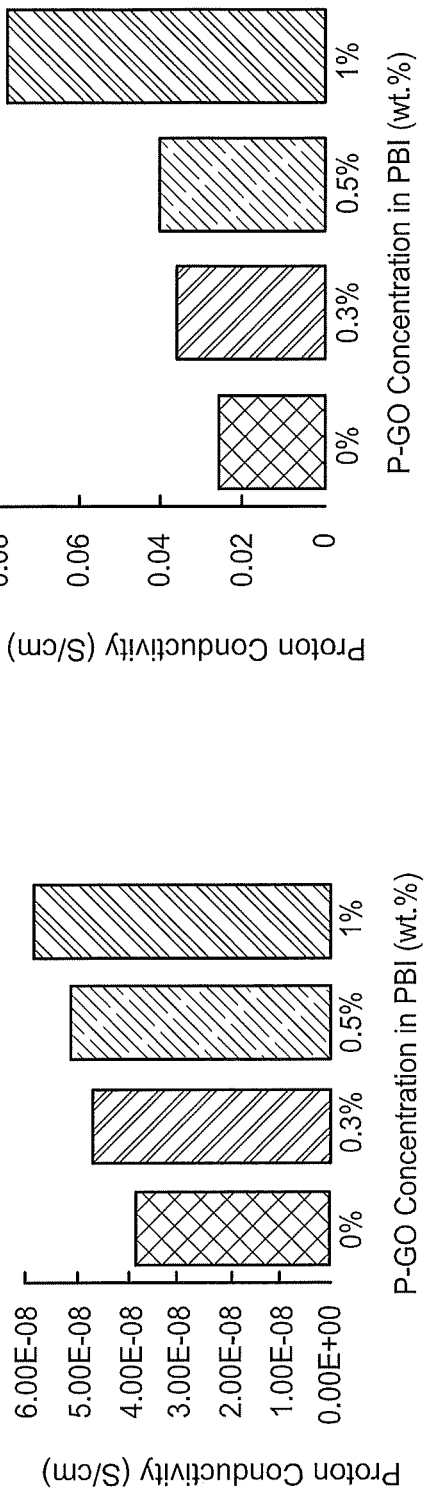
Figure 8C:
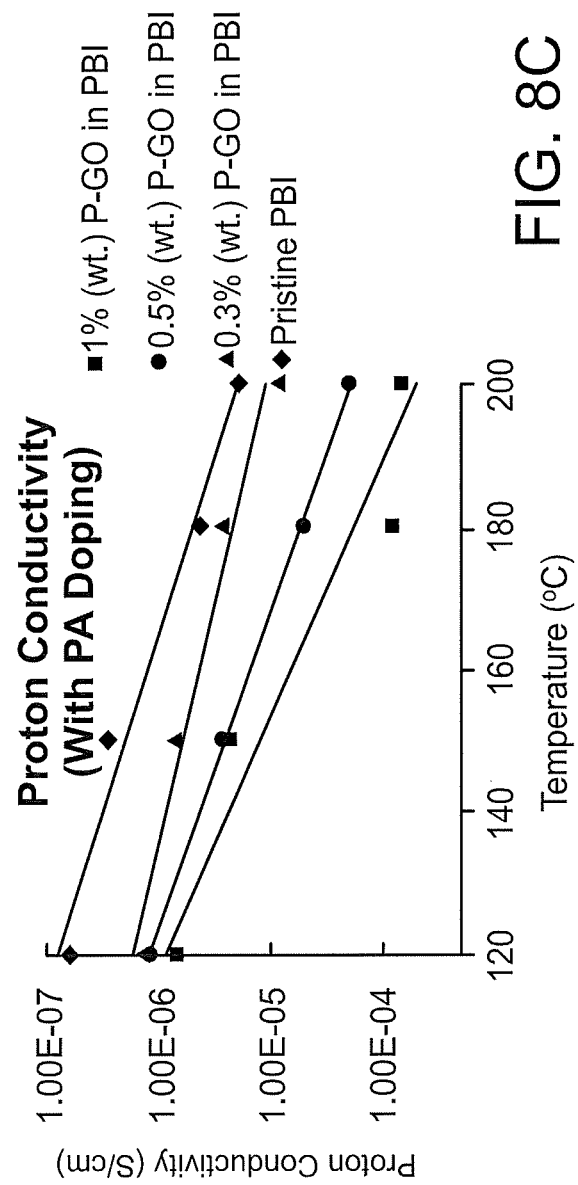

In comparison (e.g. without the PA-treatment at 80° C. in the humidity chamber), the proton conductivities of pure PBI and P-GO/PBI membranes were tested in parallel in the same manner. The results showed that the P-GO loading from 0.3% to 1.0% resulted in a slight increase in proton conductivity, without any PA-treatment (FIG. 8a). Given the fact that pure PBI membranes exhibit little proton conductivity by itself, the increase in proton conductivity here in the P-GO/PBI is attributed to the abundant proton conductive sites across P-GO's surface. For further boosting the conductivity, both pure PBI membranes and P-GO/PBI membranes were treated with PA and tested at 80° C., in the humidity chamber. The 1 wt. % P-GO incorporation into the PBI membrane resulted in proton conductivity increasing from 0.024 S/cm to 0.077 S/cm, whereas 0.3% P-GO/PBI and 0.5% P-GO/PBI composite membranes exhibited the proton conductivity of 0.036 S/cm, and 0.04 S/cm, respectively (FIG. 8).

On this basis, P-GO/PBI and pure PBI membranes were tested at 120° C., 150° C., 180° C. and 200° C. under anhydrous conditions, in order to evaluate the membranes proton conductivity at elevated temperatures. An important finding was that P-GO addition into the PBI increased proton conductivity along with the temperature. In particular, 1.0 wt %, 0.50 wt %, 0.30 wt %, and 0% P-GO in PBI exhibited the proton conductivity of $0.14 \times 10^{-3}$, $0.5 \times 10^{-4}$, $0.11 \times 10^{-4}$, and $0.5 \times 10^{-5}$ S/cm at 200° C., respectively. Regardless, the PBI membrane high thermal stability, the impregnated PA can reduce the PBI's mechanical integrity way below 200°. Nanoblending GO into the PBI membrane can help maintain the GO/PBI integrity up to certain temperatures (140°-160°). Once above ~160°, GO starts becoming electrically conducting in lieu of proton conducting that result in significant decrease in PBI's proton conductivity. To date, the best results in literature reported the proton conductivity of GO containing PBI composite membranes decreased once above 160° C. due to the degradation of GO's oxygenated groups including epoxy and carboxylic acid groups. However, the findings from this study revealed that P-GO impregnated PBI's proton conductivity did not decrease in heating up to 200° C. over the time. Indeed, these results suggested that highly thermal-stable proton-conductive phosphonic acid groups and abundant hydroxyl groups on P-GO formed stable proton-conducting pathways within PBI that effectively improved the proton conductivity at the elevated temperatures.

Herein, PBI and P-GO/PBI membranes were impregnated with PA by immersing them into the 15 M phosphoric acid solution. Pure PBI exhibited the highest PA uptake (128.86 wt %), while 1.0 wt % P-GO/PBI showed the lowest PA uptake (111.31 wt. %). This finding was expected and suggested that P-GO occupied some of the spaces in PBI membrane that could have been used by PA. Surprisingly, 1.0 wt % P-GO/PBI improved proton conductivities even though the PA-uptake is lower than that of pure PBI. This exiting finding could be explained by that well dispersed P-GO in PBI helped establish more of effective proton conducting pathways through the polymer matrix besides PA-added proton conducting channels. Furthermore, too much PA-impregnation at high concentration can deteriorate PBI's acid-decomposable backbone structure. In other words, the P-GO apparently helped PBI to maintain its high mechanical integrity during such high concentration PA impregnation. Therefore, the higher proton conductivities can be obtained in P-GO/PBI even at lower concentration of PA impregnation.

Figure 9:
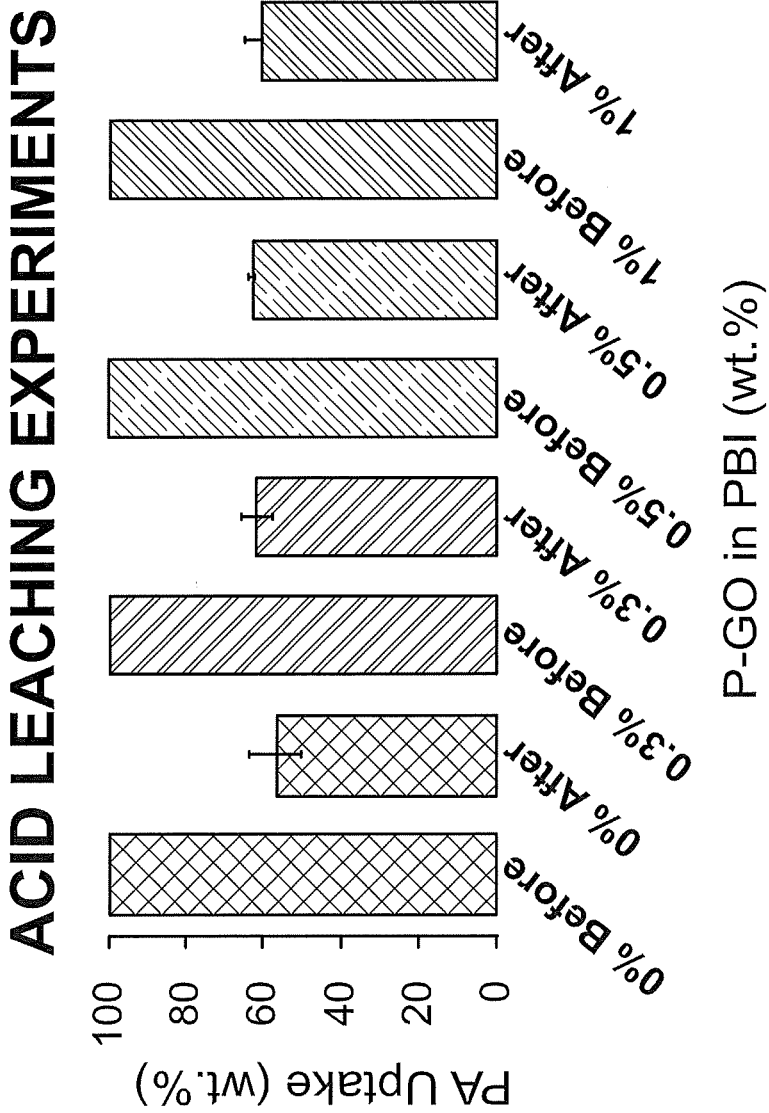
FIG. 9—Phosphoric acid uptake and release studies.

One of the major issues about PBI membranes is acid leaching over the time of the fuel cell operation, since PA is the only proton conducting media in the pure PBI and can leach out rapidly over the time. With the partially retained oxo-groups well miscible with the PA, the P-GO ought to significantly minimize the PA-loss problem even at the elevated temperature during the fuel cell operations. In experiment, membranes were exposed to expedited leaching conditions in DI water at 80° C. under an agitation. The 1.0 wt % P-GO/PBI membrane demonstrated the highest resistance to acid leaching among all thus-blended membranes known to date, by design. For example, the 1.0 wt % P-GO/PBI membrane maintained 60.68 wt % phosphoric acid uptake, while pure PBI membrane only maintained 56.56 wt % after the leaching experiments (FIG. 9). It should be noted that the PA-uptake of pure PBI was 13.0 wt. % more than that of 1.0 wt % P-GO/PBI membrane. These results suggested that P-GO probably networked with PA via hydrogen-bonds in the nanoscale, which substantially improved PBI's resistance to the acid leaching and in turn proved the nanoblending.

Mechanical Properties

Figure 11:
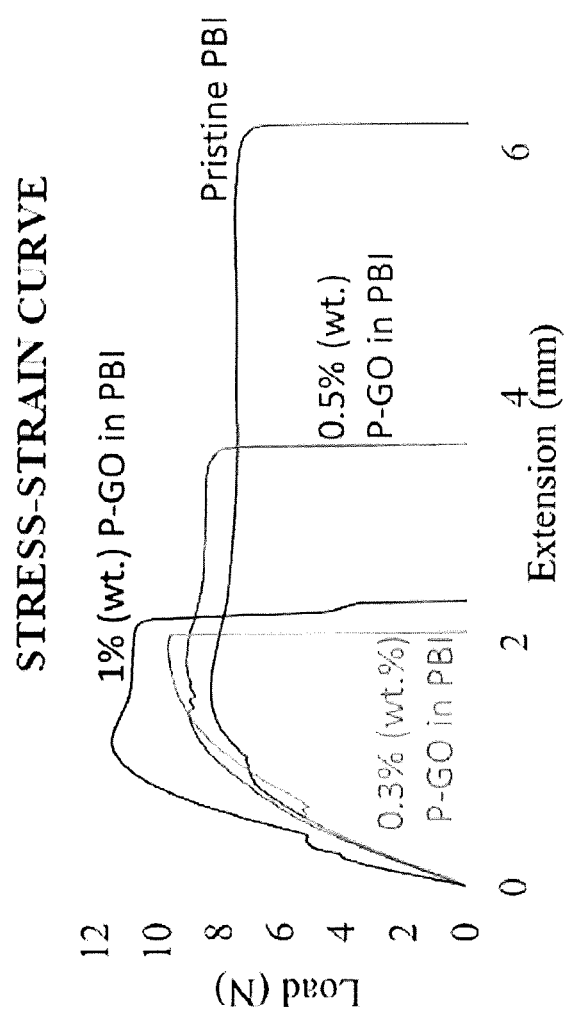

The mechanical stability is one of the most important factors determining proton conducting membranes' lifespan and marketability. Thus far, several studies indicated that PA impregnation into the PBI membrane resulted in decreased mechanical strength, since excess phosphoric acid causes separation of polymer backbones. In our study, the mechanical properties of P-GO/PBI membranes were evaluated by tensile strength measurement. At least three strips of same size were measured for taking average for each group. Typical stress-strain curves of the P-GO/PBI samples were shown in FIG. 11, and the average Young's modulus and tensile strength of the samples were compared in Table 1.

TABLE 1

Mechanical Properties of P-GO/PBI Nanocomposites

| P-GO content (wt. %) | Young's modulus (GPa) ± SE | Tensile strength (MPa) ± SE |
|---|---|---|
| 0 | 2.47 ± 320.6 | 85 ± 6.6 |
| 0.3 | 2.9 ± 118.2 | 88.7 ± 1.1 |
| 0.5 | 2.94 ± 268.6 | 94.64 ± 2.7 |
| 1 | 3.42 ± 241.1 | 102.9 ± 1.7 |

Figure 10:
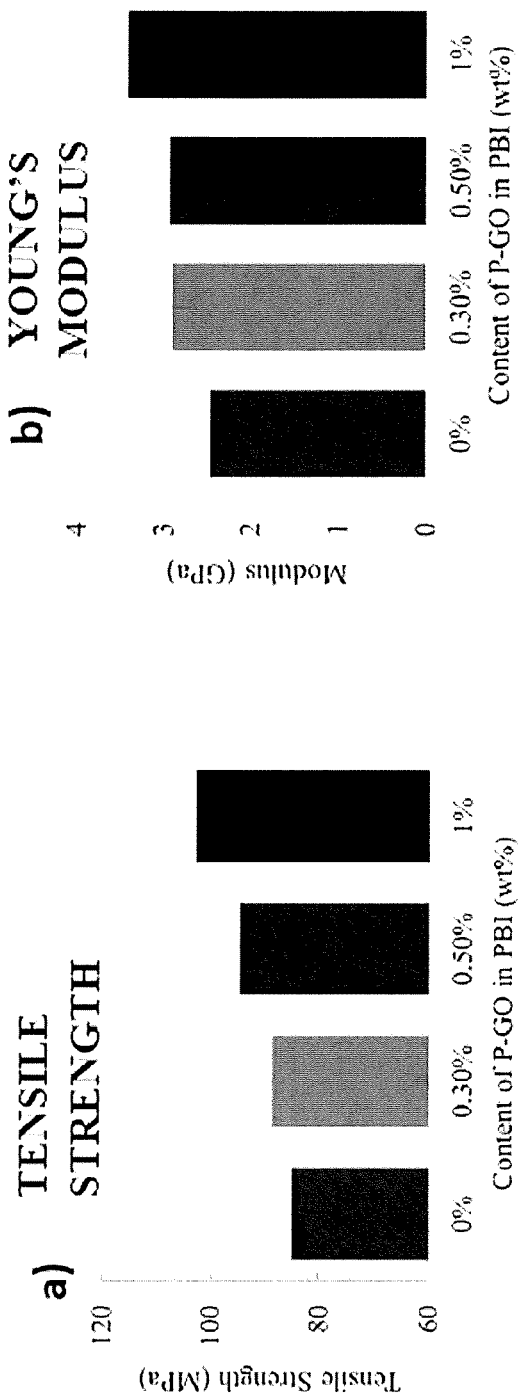
FIG. 10—(a) Tensile strength of pristine PBI and P-GO/PBI. (b) Young's modulus of pristine PBI and P-GO/PBI FIG. 11—Stress—stress curve of pristine PBI and P-GO/PBI

The incorporation of 0.3 wt % P-GO into the pure PBI increased the tensile strength from 85 MPa to 88.7 MPa and increased the Young's modulus from 2.47 GPa to 2.90 GPa, respectively (FIG. 10). 0.5 wt % of P-GO into PBI membrane showed small increase in tensile strength and Young's modulus (94.64 MPa and 2.94 GPa, respectively). However, PBI membrane with 1.0 wt.% of P-GO revealed a significant increase in mechanical strength. The tensile strength of 1.0 wt % of P-GO/PBI increased by 21% (from 85 MPa to 102.9 MPa), whereas the Young's modulus increased by 38.5 wt. % (from 2.47 GPa to 3.42 GPa) comparing to pure PBI. The increase between pure PBI' and P-GO incorporated PBI membrane is substantially higher than the similar in literature.

Intuitively, a homogenous distribution of P-GO in PBI is responsible for the gradual increase in mechanical strength upon increasing the P-GO loading. In the present study, even 1.0 wt % of P-GO can significantly increase the Young Modulus and tensile strength of the PBI membrane. The tensile strength for 1.0 wt % of P-GO incorporated PBI (with 21% increase from pure PBI to 1.0 wt % P-GO incorporated PBI samples) showed higher values than 5 wt % graphene incorporated PBI results in literature (e.g. 11.5% increase from 0% to 5 wt % graphene in PBI). In other words, only the successful nanoblending can possibly improve the mechanical properties of the new PEM by that much in the simple and scalable manner.

As proven in the above, the GO was partially phosphonated by 2-AEP at 80° and the resulting P-GO was well nanoblended into the PBI matrix. In comparison with the pure PBI after the same PA treatment, the 1.0 wt % P-GO/PBI membrane proton conductivity was increased by ~300% at both 80° C. and 200° C. Without compromising the PBI's thermal stability, the nanoblending increased the tensile strength by ~40%, and significantly minimized the long-standing problem PA-leaching for the pure PBI. In a broader scope, these findings concluded a low-cost, simple, generalizable and industry-viable methodology for mass-producing new nanocomposites from functionalizing and nanoblending graphene-like 2D nanomaterials.

Materials and Methods a). Preparation of PBI solution in DMAc. Powder of PBI (poly(2,20-m-(phenylene)-5,50-bibenzimidazole) (PBI Performance Products, Inc., N.C., USA.) was dissolved in N,N-dimethylacetamide (DMAc) (Alfa Aesar, 99%) at 180° C. in an autoclave for 4 hours to form a PBI/DMAc solution. The PBI/DMAc solution was centrifuged at 4000 rpm to remove non-dissolved particles from the solution. A clear PBI solution was obtained and its concentration was calculated by drying certain amount of PBI solution in an air-dry oven at 170° C. for overnight. To remove DMAc from PBI solution, 170° C. was selected since it is above DMAc boiling point which is 165° C.

b). GO Synthesis. The GO was synthesized using modified Hummer's method (ref). Simply, 0.5 g graphite powder (Alfa Aesar, natural, briquetting grade, −200 mesh, 99.9995% metal basis) and 0.5 g $NaNO_3$ (Alfa Aesar, 98+%) were added into 23 mL of concentrated $H_2SO_4$ (BDH Aristar, 95-98% min) solution under stirring in an ice bath for 15 minutes. This was followed by adding 4 g of $KMnO_4$ (J. T. Baker, 99% min) gradually under stirring for another 30 minutes in an ice bath, and transferring into a 40° C. water-bath under a stirring for about 90 minutes. The resultant paste was diluted with 50 mL deionized water, stirred for 15 minutes, and then mixed with 6 ml of $H_2O_2$ (Alfa Aesar 29-32% w/w) and 50 mL DDI water. The resultant product was washed with a copious amount of DDI water and dried at 40° C. in air over 24 hours.

c). Phosphonic acid treatment of GO. P-GO was synthesized by introducing 2-Aminoethly phosphonic (2-AEP) acid into graphene oxide through epoxide ring opening reaction[22]. Briefly, 100 mg of GO was uniformly dispersed in 100 mL DI water. Then, 200 mg of 2-AEP were sonicated with GO solution for 1 hour and refluxed in an oil bath at 80° C. for 2 hours. Afterwards, 200 mg KOH were introduced into the solution and refluxed for 22 hour in an oil bath at 80° C. After 24 hours reflux, the black solution was centrifuged and washed several times with acetone and water, respectively until its pH becomes neutral. P-GO solution in water was combined with desired amount of DMAc and water was eliminated from the solution via vacuum evaporation process. Vacuum evaporator was adjusted to 40° C. to eliminate DI water.

d). Preparation of PBI and P-GO/PBI composite membranes. The pristine PBI, GO/PBI and P-GO/PBI composites were prepared using facile and cost effective drop casting method. PBI, GO/PBI and P-GO/PBI solutions were obtained in DMAc. All prepared solutions were poured on a glass substrate that was sonicated in acetone/water solution prior to casting. The membranes were dried for overnight at 60° C. to remove DMAc followed by boiling in a copious amount of DI water to remove any residual DMAc. Their thicknesses were measured by a micrometer with an accuracy of 0.1 microns.

e). Characterization of the materials. TGA tests were performed on TGA Q50 V20.10 Build 36 under $N_2$ flow. The samples being heated from room-temperature to 350° C. at the ramping speed of 10° C./min. The XRD patterns were obtained from a Rigaku MiniFlex II Desktop X-ray diffractometer using monochromatized Cu-Kα radiation (λ=1.5418 Å) at 30 kV and 15 mA, in the range of 2-theta from 5° to 60° at a speed of 0.1°/min f). Proton conductivity. The proton conductivities of PBI and P-GO/PBI composites were obtained with two electrode AC impedance method at the frequency range of between $10^5$ Hz to 0.01 by using Gamry 600 electrochemical workstation. σ=L/(RA) equation was used to calculate proton conductivity, where σ is the proton conductivity (S/cm), L is the thickness of the sample, R is the resistance that is obtained by fitting a model in Gamry Echem Data Analyst software program and A is the stainless steel electrodes contact area. Stainless steel circle plates with 2 cm diameter were used as electrodes for each AC impedance measurements.

g). Acid treatment. All PBI and P-GO/PBI composite membranes were dried in an air fan oven at 120° C. until their weights reached to the plateau. Afterwards, membranes were immersed in 14.7 M phosphoric acid solution. After 24 hours, membranes were rinsed with copious amount of DI water and dried in air fan oven at 120° C. until the weight of the membrane remain the same. The acid weight ratio is obtained by using the following equation: Acid weight ratio=$(m_1-mass_2)/m_2\times 100\%$, where $m_2$ is the dry weight of the membrane whereas, $m_1$ is the acid doped membrane's weight.

h). Acid leaching. Phosphoric acid doped pristine PBI and P-GO/PBI composite membranes immersed into the DI water and stirred at 90° C. for 60 minutes. After 60 minutes, the weight of the membranes were recorded and leached phosphoric acid calculated based on their initial phosphoric uptake.

i). Mechanical properties characterization. The mechanical tests of the membranes were conducted with Instron 5944. At least three strips from each samples were evaluated, and the results were averaged.

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the invention.

The invention claimed is:

1. A composite membrane comprising:
   a polymeric host comprising polybenzimidazole or polybenzimidazole derivative; and
   graphene oxide dispersed in the polymeric host, wherein the graphene oxide is at least partially functionalized with phosphonic acid moieties, phosphonate moieties or combinations thereof.

2. The composite membrane of claim 1, wherein the functionalized graphene oxide is homogeneously dispersed in the polymeric host.

3. The composite membrane of claim 1, wherein the functionalized graphene oxide is not agglomerated in the polymeric host.

4. The composite membrane of claim 1, wherein the phosphonic acid moieties and/or phosphonate moieties are coupled to the graphene oxide via amide linkages.

5. The composite membrane of claim 1, wherein the functionalized graphene oxide is present in an amount of 0.1-1 weight percent of the composite membrane.

6. The composite membrane of claim 5 having Young's modulus of 2.5-5 GPa.

7. The composite membrane of claim 5 having tensile strength of 85-120 MPa.

8. A method of making the composite membrane of claim 1 comprising:
   providing a polymeric host comprising polybenzimidazole or polybenzimidazole derivative;
   functionalizing graphene oxide with phosphoric acid moieties, phosphonate moieties or combinations thereof; and
   blending the functionalized graphene oxide with the polymeric host.

9. The method of claim 8, wherein the functionalized graphene oxide is dispersed in the polymeric host.

10. The method of claim 8, wherein the functionalized graphene oxide is not agglomerated in the polymeric host.

11. The method of claim 8, wherein the phosphonic acid moieties and/or phosphonate moieties are coupled to the graphene oxide via amide linkages.

12. The method of claim 8, wherein the functionalized graphene oxide is present in an amount of 0.1-1 weight percent of the composite membrane.

13. The method of claim 8, wherein the composite membrane has Young's modulus of 2.5-5 GPa.

14. The methods of claim 8, wherein the composite membrane has tensile strength of 85-120 MPa.

15. The composite membrane of claim 1, wherein the polymeric host comprises (poly(2,20-m-(phenylene)-5,50-bibenzimidazole).

* * * * *